United States Patent [19]

De Fockert et al.

[11] Patent Number: 4,961,697

[45] Date of Patent: Oct. 9, 1990

[54] DOUGH PIECE BENDING DEVICE

[75] Inventors: Gijsbert De Fockert, Herwijnen; Armin G. Seegers, Zoelen, both of Netherlands

[73] Assignee: Machinefabriek C. Rijkaart B.V., Netherlands

[21] Appl. No.: 311,592

[22] Filed: Feb. 16, 1989

[30] Foreign Application Priority Data

Feb. 17, 1988 [NL] Netherlands ............... 8800402

[51] Int. Cl.⁵ .................... A21C 11/00; B29C 53/02
[52] U.S. Cl. ........................ 425/327; 99/353;
425/328; 425/371; 425/397; 425/403
[58] Field of Search ............... 425/319, 323, 328, 332,
425/334, 336, 383, 403, 392, 397, 383, 394, 364,
363, 371, 139, 99, 321, 335, 343, 391, 392, 394,
371, 327, 397, 403; 426/500, 501, 502, 503, 496,
499, 512; 264/339, 295; 99/450, 348, 485, 353,
450.1, 450.2; 198/461, 419.3

[56] References Cited

U.S. PATENT DOCUMENTS

| | | | |
|---|---|---|---|
| 1,089,725 | 3/1914 | Schaetzel | 425/323 |
| 1,908,640 | 5/1933 | Dunn | 425/99 |
| 2,057,772 | 10/1936 | Elliott | 425/323 |
| 2,114,951 | 4/1938 | Young et al. | 425/323 |
| 3,232,414 | 2/1966 | Brigham et al. | 198/461 |
| 4,582,472 | 4/1986 | Hanson | 425/139 |

FOREIGN PATENT DOCUMENTS

| | | | |
|---|---|---|---|
| 0207903 | 1/1987 | European Pat. Off. | |
| 5767886 | 5/1933 | Fed. Rep. of Germany | 425/323 |
| 2603168 | 8/1976 | Fed. Rep. of Germany | 425/334 |
| 2558339 | 7/1985 | France | |
| 135992 | 6/1979 | German Democratic Rep. | 264/295 |
| 431852 | 8/1975 | U.S.S.R. | 425/334 |
| 2174036 | 10/1986 | United Kingdom | |

*Primary Examiner*—Willard Hoag
*Attorney, Agent, or Firm*—Ostrolenk, Faber, Gerb & Soffen

[57] ABSTRACT

A device for bending an elongated dough product includes a first endless conveyor for conveying the products along a conveyance path. The first conveyor includes a plurality of spaced apart passages. The device further includes a second endless conveyor which includes a plurality of spaced apart mandrels. As the conveyors move, the mandrels are (a) successively fed upwardly into the passages, (b) then moved together with the first conveyor along the conveyance path and (c) then removed from the passages. As the products are conveyed along the conveyance path, they are successively bent around the mandrels.

19 Claims, 4 Drawing Sheets

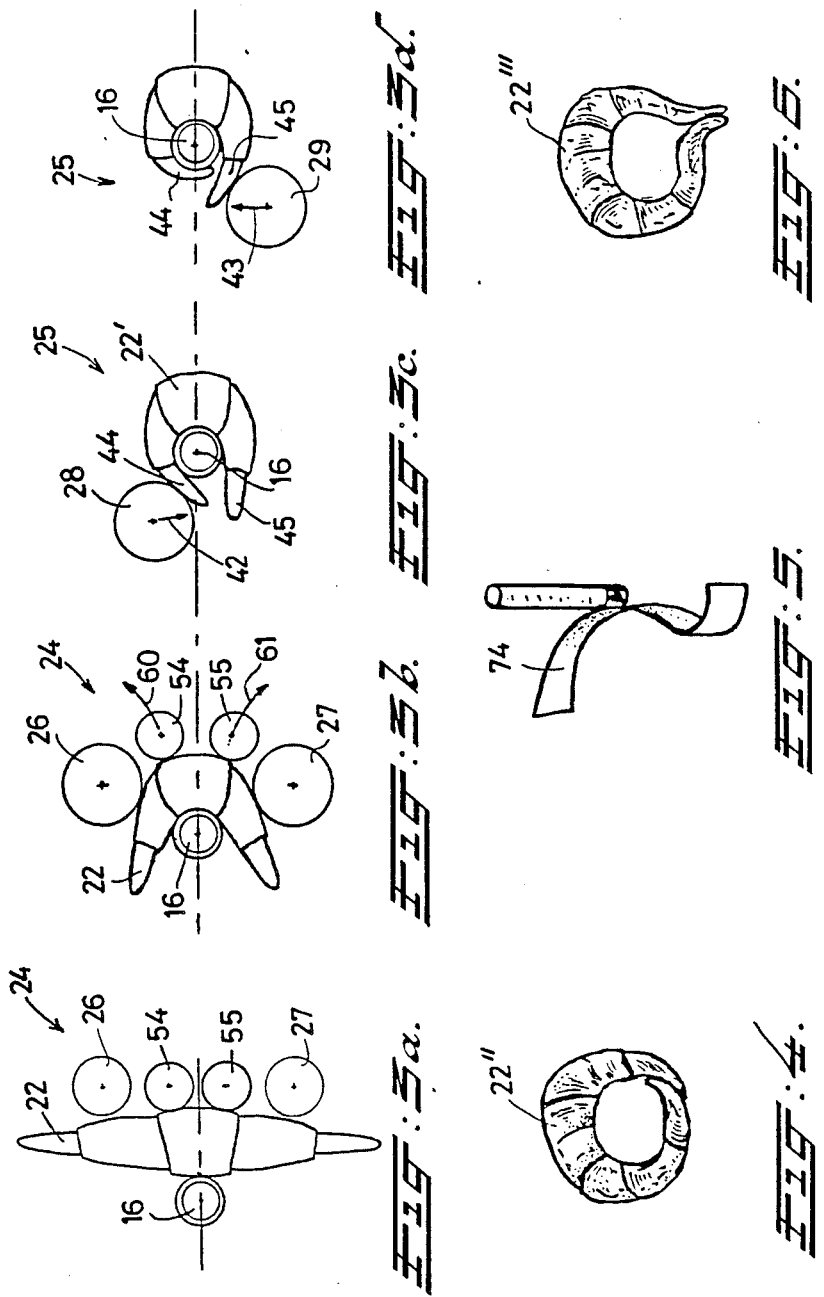

DOUGH PIECE BENDING DEVICE

BACKGROUND OF THE INVENTION

The invention relates to a device for bending an elongated dough product, comprising a first endless conveyance means which is suitable for receiving and conveying on a part of a conveyance surface thereof a row of products at a predetermined spacing from each other, the center line of each product running essentially perpendicular to the conveyance direction when it is received, a mandrel having a center line crossing the first conveyance means, means of movement for moving the mandrel in the conveyance direction in the conveyance path of the products and then back outside the conveyance path, and bending means arranged in a bending region on either side of the center of the conveyance path for bending a product around the mandrel.

A device of this sort is known from the European Patent Application EP No. 0,207,903. In the known device, the mandrel is formed by the end of a piston rod of a cylinder which is disposed above the first conveyance means and which is attached to a slide with which the cylinder can be moved to and fro in a vertical plane running through the center line of the conveyance path of the dough products. When the slide reaches the most upstream position thereof, the piston rod is forced out of the cylinder. The slide is then moved in the conveyance direction of the first conveyance means. During this movement, the mandrel formed by the end of the piston rod is able to intercept a dough product on the first conveyance means, after which the product can also be moved by the mandrel over the first conveyance means. In the bending region the mandrel is moved between two stationary shaping elements so that the dough product is bent essentially into a U shape therebetween. After the mandrel has passed the stationary shaping elements, the piston rod with the mandrel thereon is pulled up by the cylinder through a height which is greater than the thickness of the dough product and the slide is moved back to the most upstream position thereof. This cycle is continuously repeated.

In the known device, the slide requires time to move from the most downstream position to the most upstream position thereof. Since the slide, starting from the most upstream position thereof, also has to be back again in this position when the first conveyance means has been moved over the pre-determined spacing between the dough products, the slide has to be moved in the downstream direction more rapidly than the first transport means. This has the drawback that, while the slide is being moved in the downstream direction, a product entrained by the mandrel is able to rotate around the mandrel and may even come completely free of the mandrel. This means that a number of dough products received by the first conveyance means will not be bent and other products will be bent with insufficient uniformity. The products which have come free of the mandrel will also interfere with the satisfactory operation of the device in the bending region.

In the known device for a row of succeeding dough products on the first conveyance means there is only one mandrel available, as a result of which the processing rate of the device is limited by the speed at which the slide can be moved to and fro.

In addition, the known device is only suitable for bending the dough products into a U shape. This presents a drawback since a bent dough product may become straighter during subsequent processing so that a desired U shape is not maintained, while it is often also desirable to bend the ends of the dough product towards each other and even over each other.

Another drawback is that the mandrel while descending thereof may be forced onto a passing dough product and will thereby damage said product. When the mandrel is pulled back again at the end of the bending region, it is then furthermore possible that the product remains attached to the mandrel, thereby interfering with the further operation of the device.

The object of the invention is to eliminate the drawbacks of the known device.

SUMMARY OF THE INVENTION

Accordingly, the present invention relates to a device which includes a first conveyance means for conveying elongated dough products along a conveyance path. The first conveyance means includes a plurality of spaced apart passages. The device further includes a second endless conveyance means which includes a plurality of spaced apart mandrels. Each of the first and second conveyance means may be endless. The device further includes means for moving the first conveyance means and the second conveyance means such that the mandrels are (a) successively fed upwardly into the passages, (b) then moved together with the first conveyance means along the conveyance path and (c) then removed from the passages. The device further includes bending means located on either side of the conveyance path for successively bending each of the elongated dough products around the mandrels as the products are conveyed along the conveyance path.

Preferably the second conveyance means is driven by means of drive means and the first conveyance means is moved along by the second conveyance means by the mandrels projecting through the passages.

Other advantages and properties of the invention will be explained below with reference to the embodiments shown in the accompanying drawings.

BRIEF DESCRIPTION OF THE DRAWINGS

FIGS. 3a to 3d show schematically a number of operational phases of the device of FIG. 1;

FIG. 4 shows a bent elongated dough product obtained by means of the device of FIG. 1;

FIG. 5 shows in perspective an alternative embodiment for a movable shaping element of the bending means of FIG. 2;

FIG. 6 shows a bent elongated dough product obtained by using shaping elements of the type shown in FIG. 5.

DETAILED DESCRIPTION OF THE PREFERRED EMBODIMENTS

Figure 1:
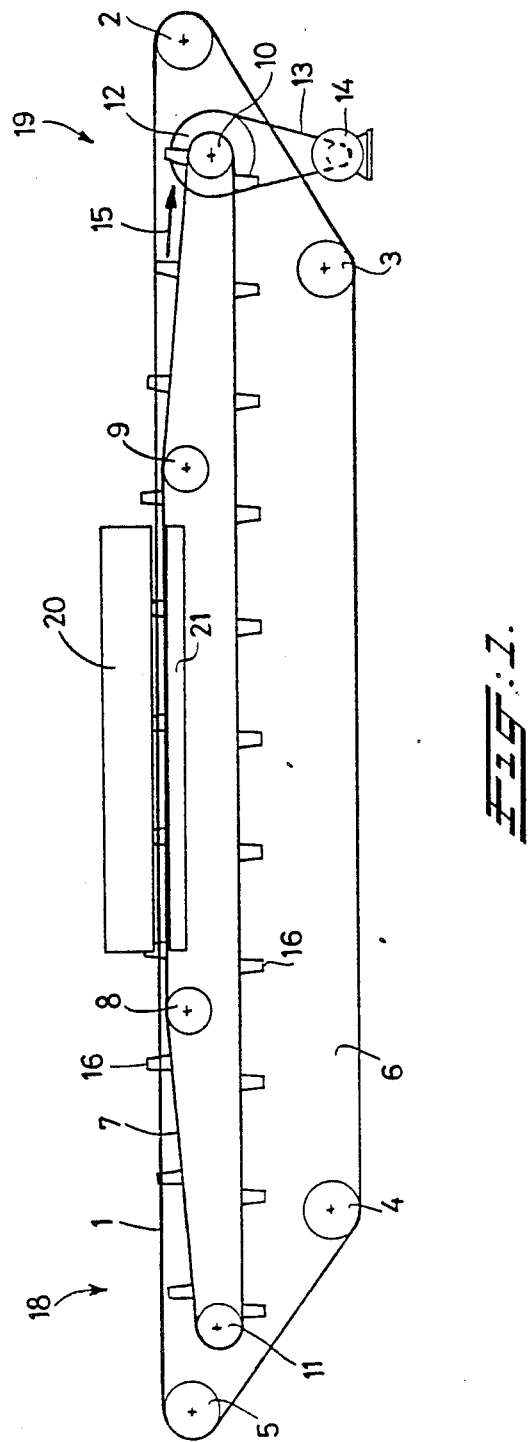
FIG. 1 shows schematically a side view of a device according to the invention.

The device according to the invention shown schematically in side view in FIG. 1 comprises a first conveyance means formed by an endless conveyor belt 1, disposed around four rollers 2 to 5 with horizontal rotary shafts mounted in a stationary frame which is not shown. In the space 6 bounded by the conveyor belt 1 provision is made for a second conveyance means formed by an endless chain 7 which is guided round four sprocket wheels 8 to 11 with horizontal rotary shafts mounted in the frame. The shaft of the sprocket wheel 10 has on it another sprocket wheel 12 which is coupled via a chain 13 to the shaft of a motor 14. The motor 14 is capable of driving the chain 7 in the direction indicated by the arrow 15.

A number of mandrels 16 are provided at equal intervals on the chain 7, projecting in a vertical plane from the chain 7. Passages 17 (FIG. 2) are formed in the conveyor belt 1 in the vertical plane of the mandrels 16 at the same intervals as those of the mandrels 16. The pulleys 2 and 5 and the sprocket wheels 8 to 11 are disposed at such heights that, on the upstream side 18 of the device, the chain 7 is guided upwards with a slight slope from the sprocket wheel 11 to the sprocket wheel 8 and on the downstream side 19 of the device it is guided downwards with a slight slope from the sprocket wheel 9 to the sprocket wheel 10, with the mandrels 16 being entirely below the level of the conveyor belt 1 at the sprocket wheels 10 and 11 and being conveyed gradually out of the passages 17 in the area between the sprocket wheels 9 and 10. In this way, during the driving of the chain 7 by the motor 14 the conveyor belt 1 is carried along by the mandrels 16 in the conveyance direction indicated by the arrow 15. This means that, regardless of any slippage between the belt and the rollers 2 to 5 on the upstream side of the device, the mandrels 16 are always in the correct position opposite the passage 17 into which they must go.

In the area between the sprocket wheels 8 and 9 provision is made in a bending region above the conveyor belt 1 for bending means, indicated in FIG. 1 schematically by the rectangle 20. In this area the chain 7 is supported, for example by means of a schematically shown plastic slide through 21. In this way, and because the chain 7 is driven on the downstream side 19 by the motor 14 and is thereby held taut, the mandrels 16 in this area are held in a stable position, which is beneficial for obtaining a uniform shape of dough product bent by means of the device. The conveyor belt 1 is also preferably supported in this area for this purpose.

Figure 2:
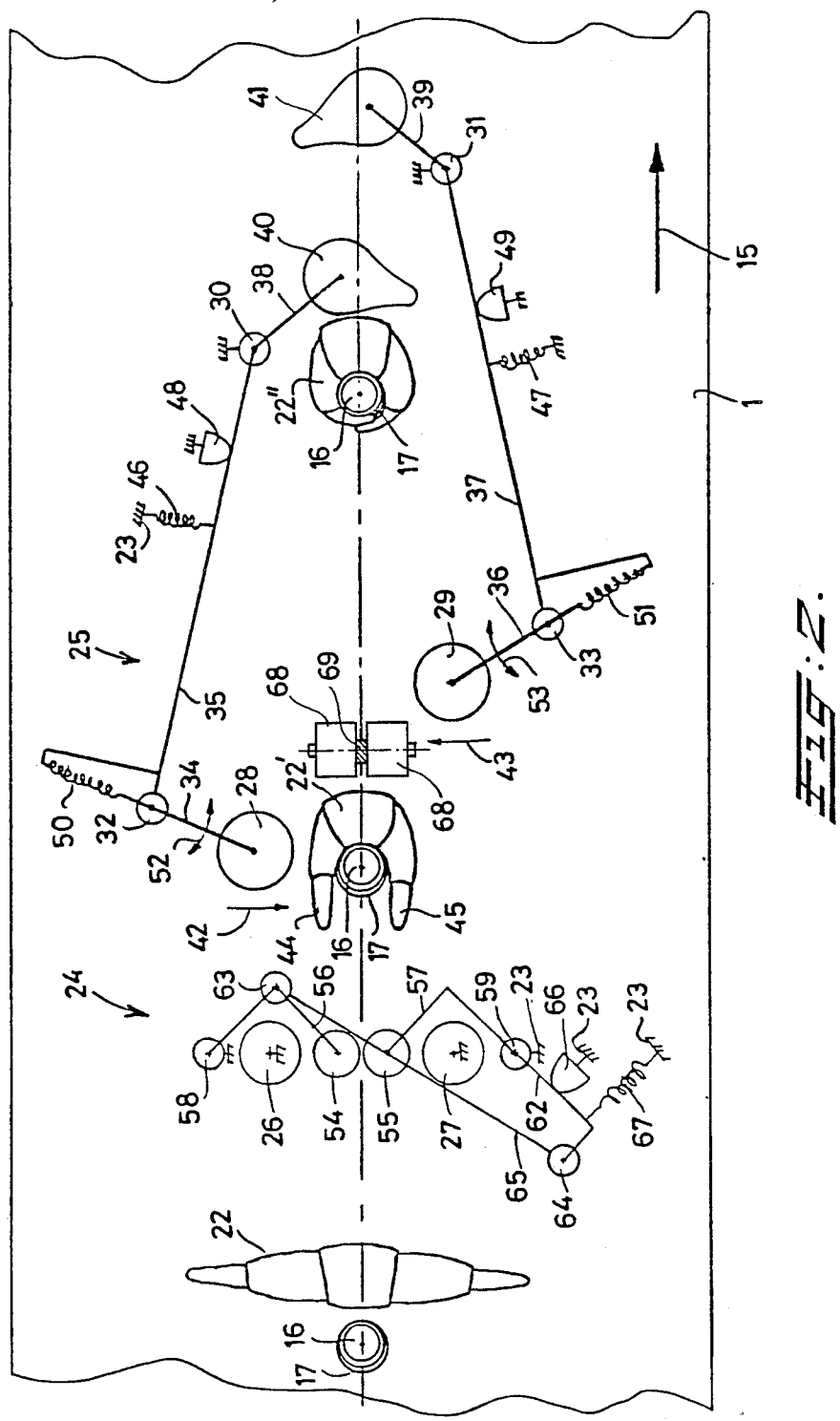
FIG. 2 shows schematically a top view of a part of the device of FIG. 1 comprising the bending means.

FIG. 2 shows a top view of a part of the conveyor belt 1 of the device of FIG. 1, with above it the bending means shown schematically in FIG. 1 by means of the rectangle 20. The bending means 20 comprise a number of movable elements, which in FIG. 2 are shown in their rest position. The bending of an elongated dough product such as 22 will be explained with reference to FIGS. 2 and 3a to 3d, whereby in FIGS. 3b to 3d the movable elements are in a position differing from their rest position. The connection of a number of parts of the bending means 20 to the frame (not shown) is indicated by the symbol 23 in FIG. 2.

The part of the conveyor belt 1 shown in FIG. 2 has three passages 17, through each of which a mandrel 16 projects upwards.

At the supply side 18 of the device elongated dough products such as dough rolls 22 for croissants are deposited on the conveyor belt, with their longitudinal axis preferably perpendicular to the conveyance direction 15 of the conveyor belt 1, at intervals corresponding to the distances between the passages 17. During conveyance along a conveyance path with respect to the frame, each dough product 22 passes through a first bending station 24 and then a second bending station 25.

The bending station 24 has stationary arc shaping elements 26, 27 on either side of the center line of the conveyance path. The distance between the arc shaping elements 26, 27 is shorter than the length of an elongated dough product 22, so that during the conveyance thereof, the dough product 22 is bent from the shape shown in FIG. 3a, via the shape shown in FIG. 3b between the arc shaping elements 26 and 27, depending on the distance between the elements 26 and 27, into an arch or U shape.

The second station 25 has a first movable shaping element 28 and a second movable shaping element 29, each of which is fixed to a respective lever which is rotatable via a hinge 30, 31 with a vertical axis of rotation. The lever in question has an articulated arm with partial arms 34 and 35, 36 and 37 coupled by means of a hinge 32, 33 respectively with vertical axis of rotation, the movable shaping element 28, 29 being connected to the partial arm 34, 36, and an arm 38, 39 to the partial arm 35, 37 respectively. Follow-on elements 40, 41 are provided at the end of the arms 38, 39 in the path of the mandrels 16. As shown, the movable shaping element 28 and the follow-on element 40 of the one lever are disposed in the conveyance direction staggered relative to the movable shaping element 29 and the follow-on element 41 of the other lever.

The follow-on elements 40, 41 are provided at a level higher than the top surface of the dough products 22 and rest against the mandrels 16 during passing of the mandrels 16, so that the lever in question with the movable shaping elements 28, 29 will swing in the direction of the arrows 42 and 43. This will cause first one leg 44 of a dough product 22' bent into a U shape in the first bending station 24 to be bent against the mandrel 16 in question (FIG. 3c) and then the other leg 45 against the earlier bent leg 44 (FIG. 3d), so that a bent dough product 22'' (FIG. 4) is obtained.

The levers are forced by means of springs 46, 47 into the rest position shown in FIG. 2 and against stop elements 48, 49.

The shape of the follow-on elements 40, 41 are selected dependent on the shape of the products 22' supplied and of the desired shape of the products 22'' to be obtained so that the movable shaping elements 28 and 29 follow a corresponding predetermined pattern.

The movable shaping elements 28, 29 can swing in the direction indicated by the double arrow 52, 53 by means of hinges 32, 33 coupled to the partial arms 34, 35 of one lever and 36, 37 of the other lever and springs 50, 51. This makes the second bending station 25 capable of processing dough products 22 with non-uniform shape and dimensions.

Depending on the lie of the products 22 and/or depending on the quality, in particular the stickiness, of the dough of the products 22, it may be desirable during the bending of the products for the central section of the products 22 in the bending stations 24, 25 to be held by supporting elements in the same position relative to the mandrel 16 lying against it.

For this purpose, the first bending station 24 has two supporting elements 54, 55 disposed on either side of the center line of the conveyance path in the bending area between the stationary shaping elements 26, 27 at the end of an arm 56, 57, said supporting elements being connected to a hinge 58, 59 with a vertical hinge pin, so that the supporting elements 54, 55 can rotate from the rest position shown in FIG. 2 in the directions indicated by the arrows 60, 61 (FIG. 3b). The arm 57 via the hinge 59 with an arm 62 forms a lever. Hinges 63, 64 with vertical hinge pins are provided at such a point on the arms 56 and 62 and a coupling rod 65 is disposed between the hinges 63 and 64 in such a way that the supporting elements 54, 55 swing simultaneously with and symmetrically relative to the center line of the conveyance path. With regard to FIG. 2, it is pointed out that the coupling rod 65 is connected only to the hinges 63 and 64. The system with the supporting elements 54, 55 is forced in the rest position shown in FIG. 2 against a stop element 66 by means of a spring 67 disposed between the frame 23 and the arm 62. The supporting elements 54, 55 will move over the dough product 22 during the swing, so that in addition to the function of positioning and maintaining the position of the dough product 22 they also have a bending function for the dough product 22.

The second bending station 25 comprises a support element, which is in particular a roller 68, which has a horizontal axis, crossing the direction of conveyance 15 perpendicular and which extends symmetrically with respect to the center of the conveyance path. The roller 68 is, at the level of the products 22′, connected to the lower, free end of an arm 69, shown only in FIG. 2 in cross section, descending from above the conveyance belt 1 and being rotatable (in FIG. 2 to the right) around a horizontal axis crossing the direction of movement 15 perpendicular and which is held by a spring, not shown, in the rest position shown in FIG. 2. The location and the shape of the roller 68 and the length of the arm 69 are selected such, possibly dependent on the shape of the product 22′, that when a product 22′ lying against a mandrel 16 passes the roller 68 it is guided over the product 22′ and then over the mandrel 16, so that during bending the product 22′ is held against the mandrel 16.

After a mandrel 16 has left the passage 17 concerned downstream of the bending means 20, the dough product 22″ is obtained at the discharge side 19 of the device. In order to avoid damage, due to sticking, of the bent dough product 22″ during the withdrawal of the mandrel 16 concerned, and in order to prevent damage to the conveyor belt 1 when the mandrels 16 are going in and out of the holes 17, the mandrels 16 are preferably in the form of a truncated cone having a diameter increasing towards the chain 7, and having a base angle of, for example, approximately 80°, preferably corresponding to the slope (10°) of the chain 7 at the supply part 18 and at the discharge part 19 of the device. As a result thereof the diameters of the passages 17 at the level of the top part of the conveyor belt 1 need only be a little larger than the diameters of the mandrels 16.

Due to the special design of the second bending station 25, with the follow-on elements 40, 41 resting against the passing mandrels 16, the second bending station 25 always—regardless of the speed of the conveyor belt 1—works in synchronism with the passing of the mandrels 16 and the dough products 22′ lying against them.

Since in the preferred embodiment shown and described the device has only one motor, namely the motor 14, the device is simple to adapt to the processing speed of a feed device and/or discharge device for dough products.

The shaping elements 26 to 29 and the supporting elements 54, 55 and 68 are preferably roller elements with a vertical axis of rotation.

The movable shaping elements 28, 29 can also be blade-shaped with a vertical axis of rotation, such as the blade-shaped shaping element 74 shown in FIG. 5, which can be used instead of the movable shaping element 29. In this way the dough product 22‴ bent in the first station 24 can be bent into a lyre shape, as shown in FIG. 6.

Other shapes of the dough products obtained by means of the bending means 20 can be obtained by suitable positioning of the different elements and choice of the lengths of the different arms. The bending means 20 could, if necessary, only comprise the bending station 24.

The stop elements 48, 49 and 66 and 71 are preferably telescopic shock absorber elements.

It is pointed out that, instead of a conveyor belt 1 and a chain 7, other conveyance means can also be used, such as separate carriers for the conveyor belt connected between two parallel chains, or a belt or push belt in stead of the chain.

It is also pointed out that the device according to the invention can be designed for processing a number of rows of dough products 22, instead of the single row shown.

It is furthermore pointed out that the movable elements, in particular the movable shaping elements 28, 29 of the bending means 20 can be moved, within the scope of the invention, by pneumatic means or the like which are controlled by control means which are coupled to the drive of the device and/or to detectors which detect the passage of the mandrels 16.

Figure 7:
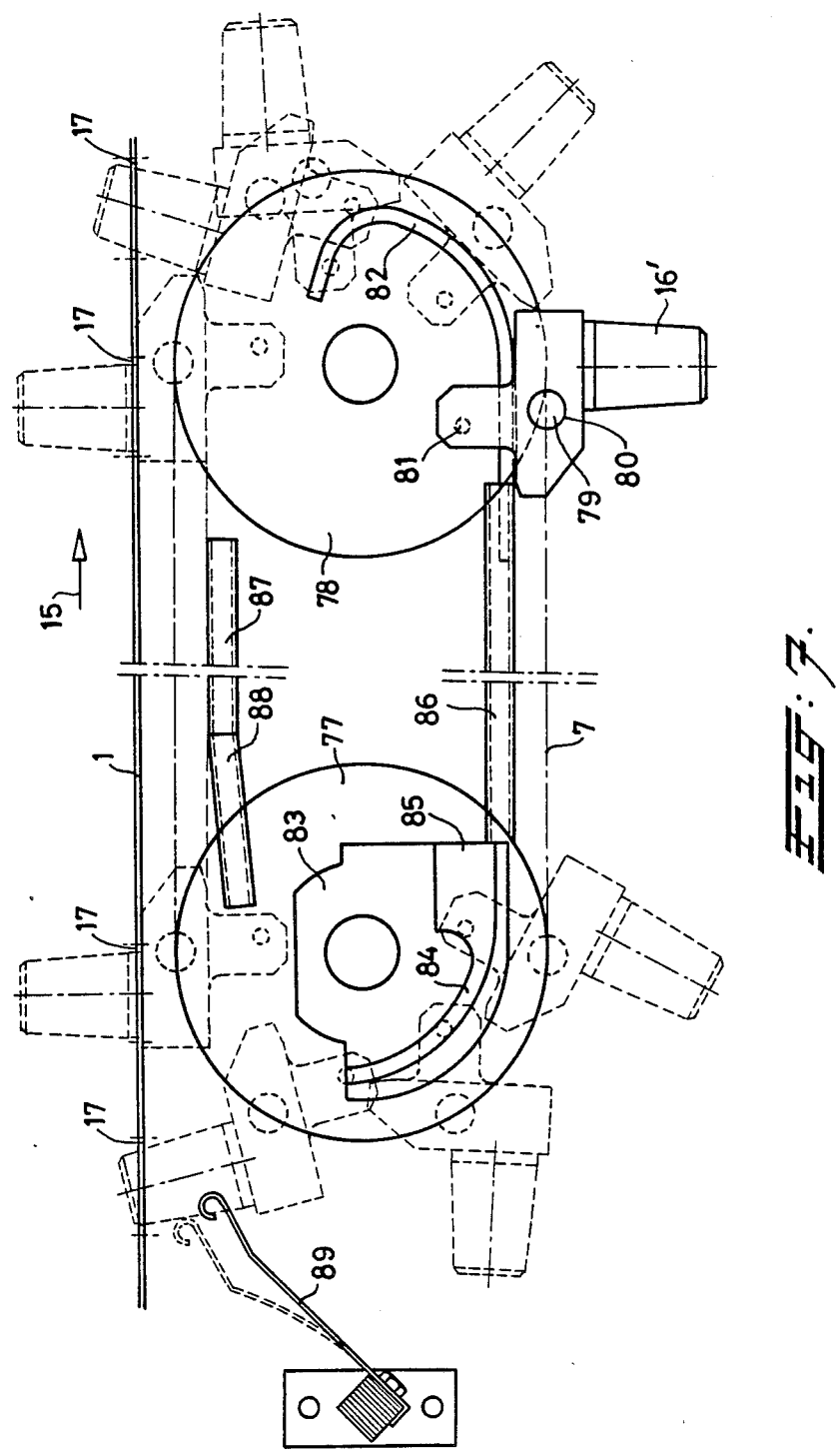
FIG. 7 shows another embodiment of the second transport means.

FIG. 7 shows schematically a side view of a part of the bending device according to the invention with the first conveyance means 1 and the second conveyance means 7. The second conveyance means 7 is indicated by a broken line and is guided around a wheel 77 and 78 upstream and downstream respectively. The second conveyance means 7 comprises, in particular, two parallel chains at a spacing from each other, between which, at least in positions which correspond to the passages 17 in the bending region, horizontal connecting rods 79 are disposed. Each mandrel 16′ of this embodiment has a passage 80 to allow the passage of a connecting rod 79 with play so that the mandrel 16′ can be rotated around the rod 79. Each connecting rod 79 is able to support a number of mandrels 16′ of a corresponding number of rows of mandrels 16′. FIG. 7 shows by continuous lines only one mandrel 16′ of a single row (on the right hand side at the bottom). The other mandrels 16′ shown with dotted lines indicate some positions of the mandrel 16′ during conveyance thereof. The spacing between the passages 17 shown in FIG. 7 are therefore also not equal to the actual spacings between the passages 17.

The mandrel 16′ has at the end thereof which is not to be inserted through the conveyor belt 1 a horizontal protruding projection 81. The passage 80 and the projection 81 are disposed in front of the center line of the mandrel 16′ viewed in the conveyance direction 15. The center of gravity of the mandrel 16′ lies on the side of the passage 80 with the part of the mandrel 16′ which is inserted through the conveyance means 1.

In the region of the wheel 78, the mandrel 16′ will drop out of the passage 17. When the mandrel 16′ has dropped completely out of the passage 17, the mandrel 16′ will fall over (to the right in FIG. 7), this movement being prevented by a bent guide rod 82.

In the region of the wheel 77, a curve disc 83 is disposed which has a guide groove 84 which has a wider capture part 85 at the inlet side thereof.

The guide rod 82 and the guide tube 86 following it serve to give the mandrel 16' an orientation such that the projection 81 thereof is captured in the wide part 85 of the guide groove 84 in the manner shown.

In the region of the wheel 77, the projection 82 will be guided into the guide groove 84, as a result of which the mandrel 16' will be raised up and will gradually project increasingly through a passage 17.

A guide tube 87 disposed beneath the conveyor belt 1 and having a part 88 sloping up from the region of the wheel 77 serves to keep the mandrel 16' in a stable position. For this purpose, the mandrel 16' preferably also has a cradle with two parallel flat legs, one of which is visible in FIG. 7 and has the projection 81 for allowing the guide tubes 87 and 88 to pass between the legs with little play.

A leaf spring 89 prevents the mandrel 16' falling back at the end of raising it.

With respect to the embodiment shown in FIG. 1, the embodiment shown in FIG. 7 has the important advantage that the device can be considerably shorter while at the same time the diameter of the passages 17 needs only to be very slightly larger than the largest diameter of the part of the mandrel 16' projection through a passage 17.

If the mandrels 16 were connected to the first conveyance means 1, contamination could occur between the mandrels 16 and the first conveyance means 1. This is because of play which would occur between the mandrels 16 and the first conveyance means 1 as the conveyance means 1 bends at the return rollers 2 and 5. There will always be such play if the mandrels 16 are not connected firmly to the first conveyance means 1. Therefore, use of the second conveyance means 8 is preferred.

We claim:

1. A device for bending elongated dough products, said device comprising:
   a first conveyance means for conveying a plurality of elongated dough products along a conveyance path, said first conveyance means including a plurality of spaced apart passages each near a dough product on said first conveyance means;
   a second conveyance means which includes a plurality of spaced apart mandrels;
   means for moving said first conveyance means and said second conveyance means such that (a) said mandrels are successively fed upwardly into respective said passages, (b) said mandrels are then moved together with said first conveyance means along the conveyance path and (c) said mandrels are then removed from said passages; and
   bending means located on either side of the conveyance path for successively bending each of the elongated dough products around a said mandrel as the dough products are conveyed along the conveyance path.

2. A device according to claim 1, wherein the bending means comprise arc shaping elements for bending each product into an arc shape, wherein the bending means in the region of the arc shaping elements comprise two supporting elements disposed in the conveyance path and on either side of the center of the conveyance path which are each disposed on such a respective supporting element arm having a vertical axis of rotation that the supporting elements are guided from a rest position determined by spring means attached to the supporting arms and situated between the arc shaping elements over the upstream side of each passing product.

3. A device according to claim 2, wherein the supporting element arms disposed in the region of the arc shaping elements are coupled by means of coupling means so that they can be moved at the same time symmetrically with respect to the conveyance path.

4. A device according to claim 1, wherein the bending means comprise arc shaping elements for bending each product into an arc shape, wherein the bending means downstream of the arc shaping elements comprise two movable shaping elements which are disposed on either side of the conveyance path and which, by suitable control by a control means, bend the end parts of each passing dough product towards each other round the mandrel lying against it.

5. A device according to claim 4, wherein the movable shaping elements are provided at a distance from each other in the direction of conveyance, and the control means are suitable for moving the movable shaping elements after each other.

6. A device according to claim 4, wherein each of the movable shaping elements is disposed on a respective shaping element arm with a vertical axis of rotation such that each of the movable shaping elements can bend at least a respective end part of each dough product towards the upstream side of a mandrel lying against it.

7. A device according to claim 6, wherein each shaping element arm has two partial arms connected to each other by means of a hinge with a vertical axis of rotation, each shaping element being disposed on a partial arm with a free end, while spring means are fixed between the partial arms such that the shaping element can swing to either side of a rest position determined by the spring means.

8. A device according to claim 6, wherein the shaping element arms are forced by means of spring means into a rest position and the control means comprise follow-on elements which are fastened to the respective shaping element arms and which are each suitable for being conveyed over part of the periphery of each passing mandrel to swing the shaping element arms.

9. A device according to claim 4, wherein in the region of the movable shaping elements and in the path of the mandrels the bending means comprise an arm descending above the conveyance surface with an axis of rotation which is perpendicular to the direction of conveyance and with a support element connected at a lower end of the arm, the support element, while a dough product passes, being suitable to be guided over the product and then over the mandrel against which the product is lying for maintaining the product against the mandrel when it is bent.

10. A device according to claim 9, wherein the support element is a roller having a horizontal axis which is perpendicular to the direction of conveyance and extending symmetrical with respect to the center of the conveyance path.

11. A device according to claim 4, wherein the movable shaping elements are blade shaped.

12. A device according to claim 11, wherein each blade-shaped shaping element is rotatable about a vertical axis.

13. A device according to claim 1, comprising supporting means for supporting the second conveyance means.

14. A device according to claim 1, comprising drive means which drive the second conveyance means, and in that the first conveyance means is moved along by the mandrels.

15. A device according to claim 1, wherein each mandrel can be rotated around a horizontal shaft which is connected to the second conveyance means, in that the center of gravity of each mandrel lies in the bending region above the shaft, and in that, in the region where the mandrels are fed into the passage, erecting means are disposed for erecting the mandrels.

16. A device according to claim 15, wherein each mandrel has a horizontal protruding projection, and in that the erecting means comprise a curved disc with a guide groove for guiding the projection of the mandrel therein.

17. A device according to claim 16, wherein the shaft and the projection of a mandrel are disposed in the conveyance direction in front of the center of the mandrel.

18. A device according to claim 1, wherein said first conveyance means is endless.

19. A device according to claim 18, wherein said second conveyance means is endless.

* * * * *